E. M. HIBBLER.
SCRAPER FOR POTS AND PANS.
APPLICATION FILED APR. 25, 1922.

1,434,744. Patented Nov. 7, 1922.

WITNESSES
Lawrence O. Mankend

INVENTOR
E. M. Hibbler,
BY
ATTORNEYS

Patented Nov. 7, 1922.

1,434,744

UNITED STATES PATENT OFFICE.

ELDRED MARSHEL HIBBLER, OF MATTSON, MISSISSIPPI.

SCRAPER FOR POTS AND PANS.

Application filed April 25, 1922. Serial No. 556,456.

*To all whom it may concern:*

Be it known that I, ELDRED M. HIBBLER, a citizen of the United States, and a resident of Mattson, in the county of Coahoma and State of Mississippi, have invented certain new and useful Improvements in Scrapers for Pots and Pans, of which the following is a specification.

My present invention relates generally to scrapers, and more particularly to an implement of this nature for use in cleaning pots and pans, my object being the provision of an implement having at one end an enlarged approximately flat blade with three sharpened edges and having at its opposite end a reduced angularly projecting cup like scraping member provided with three cutting or scraping edges for effective use in the cleaning of portions of pots and pans where the blade first mentioned is ineffective.

Figure 1:
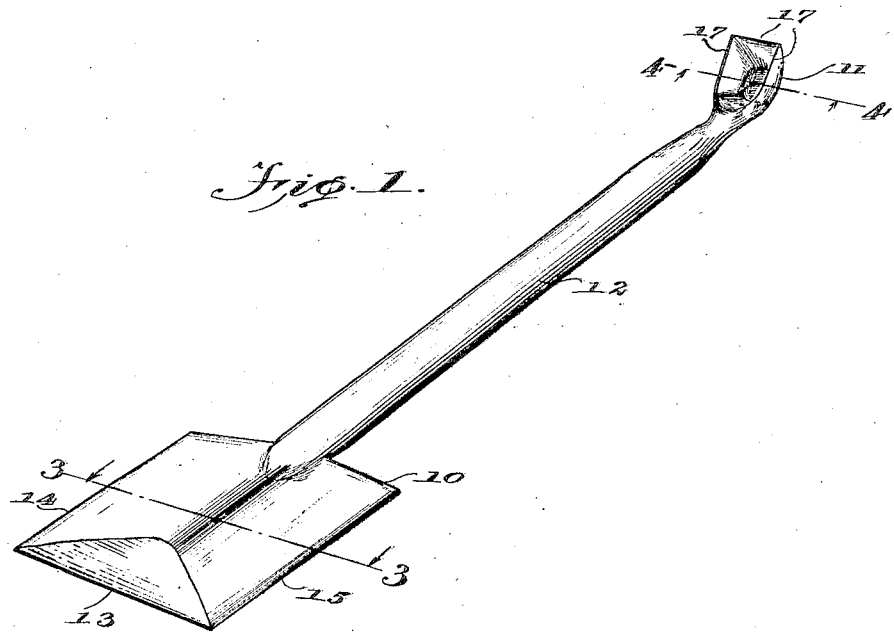
Figure 2:
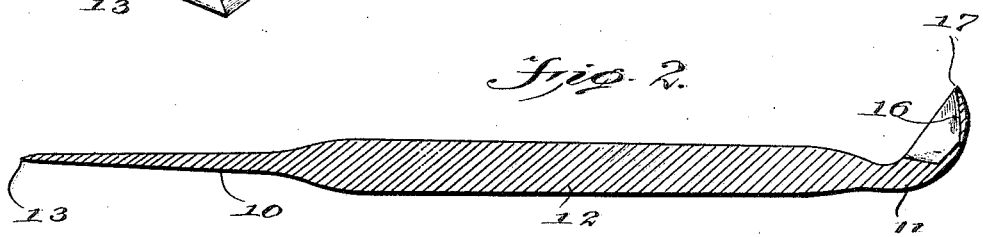
Figure 3:
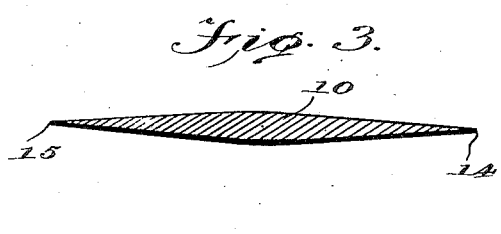
Figure 4:
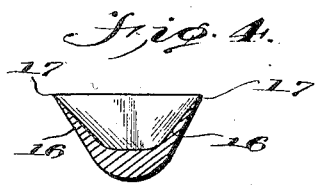

In the accompanying drawing which illustrates my present invention and forms a part of this specification, Figure 1 is a perspective view of the implement proposed by my invention, Figure 2 is a central longitudinal section taken therethrough, and Figures 3 and 4 are enlarged transverse sections taken respectively on lines 3—3 and 4—4 of Figure 1.

Referring now to these figures my invention proposes a pot and pan scraping implement having scraping members 10 and 11 at the relatively opposite ends of a rod or stem 12 which forms the handle of the implement and with which the two scraping members 10 and 11 are preferably integral as is clearly to be seen by reference to Figures 1 and 2.

Of the two scraping members, member 10 is in the form of a broad substantially flat blade, of rectangular form, having three sharpened edges, one edge 13 at its end, at right angles to the longitudinal axis of the stem or handle 12, and two parallel side edges 14 and 15 which are also parallel to the longitudinal axis of the rod or stem 12. This blade is generally effective in the removal of charred particles adhering to pots and pans on the inside thereof as well as in the loosening of material collecting upon the outside of a pot or pan particularly where it is used over a gas or oil flame. It is quite obvious however that a blade of the nature of the scraping member 10 cannot be used in the smaller sharper turns and bends of pots and pans of some styles and it is for this purpose that the scraping member 11 is primarily formed of the reduced size and particular shape seen plainly by reference to Figures 1, 2 and 4.

The scraping member 11 is of the cup shape shown and projects at a slight angle with respect to the rod or stem 12 and is generally of rectangular form with upwardly tapering walls 16 although its outer surface is rounded to avoid all external sharp angles which might interfere with its movement into small crevices and the like. The tapering walls 16 result in sharpened edges 17 at the outer end and opposite sides of this scraping member, which edges are approximately at right angles to one another so that the scraping member 11 is well adapted to be utilized in practice in the scraping of pans, pots and the like and in bends or angles of the utensils where the blade 10 at the opposite end of the rod or handle is on account of its shape and size ineffective for the purpose.

I claim:

1. A pot and pan scraping implement including an elongated handle having a substantially flat enlarged blade at one end provided with a sharpened outer edge and sharpened side edges substantially at right angles to the outer edge and extending in the same plane with the handle, and a cup shaped scraping member at the opposite end of the handle disposed at an angle thereto, and the wall of which tapers and terminates in cutting edges at its opposite sides and an outer cutting edge at right angles to the side edges.

2. An implement of the character described consisting of a rod or handle having at one end an angularly disposed cup shaped scraping member, the walls of which are of gradually reducing thickness toward its open side and terminate in end and side sharpened edges, the side sharpened edges being disposed approximately at right angles to the end sharpened edge and the outer surface of the member being rounded throughout to avoid sharp external angles for the purpose described.

ELDRED MARSHEL HIBBLER.